(12) United States Patent
Matsumoto

(10) Patent No.: US 12,472,778 B2
(45) Date of Patent: Nov. 18, 2025

(54) TIRE

(71) Applicant: The Yokohama Rubber Co., Ltd., Tokyo (JP)

(72) Inventor: Kenichi Matsumoto, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 246 days.

(21) Appl. No.: 17/757,050

(22) PCT Filed: Dec. 7, 2020

(86) PCT No.: PCT/JP2020/045400
§ 371 (c)(1),
(2) Date: Jun. 8, 2022

(87) PCT Pub. No.: WO2021/117659
PCT Pub. Date: Jun. 17, 2021

(65) Prior Publication Data
US 2023/0015786 A1 Jan. 19, 2023

(30) Foreign Application Priority Data
Dec. 13, 2019 (JP) .................................. 2019-225766

(51) Int. Cl.
*B60C 11/12* (2006.01)
*B60C 11/03* (2006.01)

(52) U.S. Cl.
CPC ...... *B60C 11/1281* (2013.01); *B60C 11/0304* (2013.01); *B60C 11/1263* (2013.01); *B60C 2011/0348* (2013.01)

(58) Field of Classification Search
CPC ............ B60C 11/1281; B60C 11/0304; B60C 11/1263; B60C 2011/0348; B60C 11/1384; B60C 11/1392; B60C 2011/0381
See application file for complete search history.

(56) References Cited

U.S. PATENT DOCUMENTS

2016/0082780 A1* 3/2016 Nagahara .............. B60C 11/042
152/209.18
2017/0210175 A1* 7/2017 Yoshimura .......... B60C 11/0309
(Continued)

FOREIGN PATENT DOCUMENTS

EP 3 208 111 A1 8/2017
EP 3 421 263 A1 1/2019
(Continued)

OTHER PUBLICATIONS

Nagayoshi, English Machine Translation of JP 2010173346, 2010 (Year: 2010).*

*Primary Examiner* — Blaine Copenheaver
*Assistant Examiner* — Brendon Charles Darby
(74) *Attorney, Agent, or Firm* — Thorpe North & Western

(57) ABSTRACT

A tread pattern of a tire includes: a circumferential main groove extending in a tire circumferential direction; a plurality of sipes extending in a tire width direction within a region of a land portion in contact in the tire width direction with the circumferential main groove; and a chamfered surface having a tread surface of the land portion inclined toward the circumferential main groove in an end portion in the tire width direction on a circumferential main groove side of the land portion, the chamfered surface being provided in a plurality in the tire circumferential direction, and the sipes opening to the plurality of the chamfered surfaces without reaching a groove wall of the circumferential main groove. The length of the chamfered surface in the tire circumferential direction is greater than the length thereof in the tire width direction.

20 Claims, 5 Drawing Sheets

(56) References Cited

U.S. PATENT DOCUMENTS

| | | | |
|---|---|---|---|
| 2017/0225515 A1* | 8/2017 | Hayashi | B60C 11/0304 |
| 2018/0370290 A1* | 12/2018 | Hirosue | B60C 11/1263 |
| 2021/0008928 A1 | 1/2021 | Nakazaki | |

FOREIGN PATENT DOCUMENTS

| | | | | |
|---|---|---|---|---|
| JP | 2003-170709 A | | 6/2003 | |
| JP | 2009-61985 A | | 3/2009 | |
| JP | 2010173346 A | * | 8/2010 | B60C 11/0306 |
| JP | 2014-73706 A | | 4/2014 | |
| JP | 2015-189349 A | | 11/2015 | |
| JP | 2016-049878 A | | 4/2016 | |
| JP | 2016-064726 A | | 4/2016 | |
| JP | 2017-132317 A | | 8/2017 | |
| JP | 2017-226369 A | | 12/2017 | |
| JP | 2019-182206 A | | 10/2019 | |
| WO | WO 2019/159564 A1 | | 8/2019 | |

* cited by examiner

TIRE

TECHNICAL FIELD

The present technology relates to a tire having a tread pattern in a tread portion.

BACKGROUND ART

One known way to improve the wet performance of a tire is to provide, on a tread surface of the tire, a main groove extending in a tire circumferential direction and also a lug groove extending in a tire width direction for ensuring drainage properties. However, in a configuration in which the lug groove has a large groove volume, a loud popping sound is generated when kicking out, and performance to reduce tire noise (hereinafter referred to as noise performance) is degraded.

In the related art, there is known a tire without a groove having a width of 2 mm or more provided in a crown land portion or a middle land portion in a tread portion (see Japan Unexamined Patent Publication No. 2017-226369).

In a configuration of Japan Unexamined Patent Publication No. 2017-226369, to avoid degrading noise performance, a groove having a width of 2 mm or more is not provided in a crown land portion or a middle land portion on a tread surface including a main groove and a lug groove, groove volume decreases, and thus noise performance improves, but drainage properties cannot be ensured due to a decrease in the groove volume, degrading wet performance.

SUMMARY

The present technology provides a tire that provides improved wet performance while suppressing degradation of noise performance.

An aspect of the present technology is a tire including a tread pattern in a tread portion.

The tread pattern includes: a circumferential main groove extending in a tire circumferential direction; a plurality of Sipes that extend in a tire width direction within a region of a land portion in contact in the tire width direction with the circumferential main groove and that are disposed at intervals in the tire circumferential direction; and a chamfered surface having a tread surface of the land portion inclined toward the circumferential main groove in an end portion in the tire width direction on a circumferential main groove side of the land portion, the chamfered surface being provided in plurality in the tire circumferential direction, and the sipes opening to the plurality of the chamfered surfaces without reaching a groove wall of the circumferential main groove. The length of the chamfered surface in the tire circumferential direction is greater than a length of the chamfered surface in the tire width direction.

Preferably, the length of the chamfered surface in the tire circumferential direction is from 5 to 50% of a length of an interval of the sipes adjacent in the tire circumferential direction, the sipes opening to the chamfered surface.

Preferably, a ratio of the length of the chamfered surface in the tire circumferential direction to the length of the chamfered surface in the tire width direction is greater than 1, and 10 or less.

Preferably, a maximum depth of the chamfered surface is greater than a depth of the sipe opening to the chamfered surface.

Preferably, the chamfered surface has a substantially triangular shape that decreases in length in the tire width direction from one side in the tire circumferential direction to an other side in the tire circumferential direction.

Preferably, the sipe includes a raised bottom portion at an opening end portion of the sipe opening to the chamfered surface, the raised bottom portion having a depth greater than a maximum depth of the sipe.

Preferably, the tread pattern further includes, in the region of the land portion, a wall surface of the land portion adjacent to the chamfered surface, the wall surface of the land portion extending continuously from a wall surface of the sipe, from the opening end portion of the sipe opening to the chamfered surface to a wall surface of the circumferential main groove to which the chamfered surface is inclined, and the wall surface extends without being inclined with respect to a tire radial direction.

Preferably, the tread pattern further includes, in the region of the land portion, a wall surface of the land portion adjacent to the chamfered surface, the wall surface of the land portion extending continuously from a wall surface of the sipe, from the opening end portion of the sipe opening to the chamfered surface to a wall surface of the circumferential main groove to which the chamfered surface is inclined, and the wall surface extends along an extension direction of the sipe opening to the chamfered surface.

The circumferential main groove, the land portion, the sipe, and the chamfered surface are referred to below as a first circumferential main groove, a first land portion, a first sipe, and a first chamfered surface. Preferably, the tread pattern includes: a second circumferential main groove extending in the tire circumferential direction and disposed at an interval in the tire width direction from the first circumferential main groove so as to sandwich the first land portion between the second circumferential main groove and the first circumferential main groove; a plurality of second sipes that extend in the tire width direction within a region of the first land portion and that are disposed at intervals in the tire circumferential direction; and a second chamfered surface having a tread surface of the first land portion inclined toward the second circumferential main groove in an end portion in the tire width direction on a second circumferential main groove side of the first land portion, the second chamfered surface being provided in plurality in the tire circumferential direction, and the second sipes opening to the plurality of the second chamfered surfaces without reaching a groove wall of the second circumferential main groove, and a length of the second chamfered surface in the tire circumferential direction is greater than a length of the second chamfered surface in the tire width direction.

Preferably, the lengths in the tire circumferential direction of the first chamfered surface and the second chamfered surface are different from each other.

Preferably, the region of the first land portion is disposed on one side of a tire centerline in the tire width direction, and of the first chamfered surface and the second chamfered surface, the length in the tire circumferential direction of the one chamfered surface that is farther from the tire centerline is greater than the length in the tire circumferential direction of the one chamfered surface that is closer to the tire centerline.

Preferably, ranges of positions of the first chamfered surface and the second chamfered surface in the tire circumferential direction do not overlap each other.

Preferably, the first sipe and the second sipe are inclined to a same side in the tire circumferential direction with respect to the tire width direction.

Preferably, the first sipe and the second sipe are disposed alternately in the tire circumferential direction.

Preferably, the tread pattern further includes: a third circumferential main groove extending in the tire circumferential direction and disposed at an interval from the second circumferential main groove on an opposite side of the second circumferential main groove from the first circumferential main groove; a plurality of third sipes that extend in the tire width direction within a region of the second land portion between the third circumferential main groove and the second circumferential main groove and that are disposed at intervals in the tire circumferential direction; and a third chamfered surface having a tread surface of the second land portion inclined toward the third circumferential main groove in an end portion in the tire width direction on a third circumferential main groove side of the second land portion, the third chamfered surface being provided in plurality in the tire circumferential direction, and the third sipes opening to the plurality of the third chamfered surfaces without reaching a groove wall of the third circumferential main groove, and a length of the third chamfered surface in the tire circumferential direction is greater than a length of the third chamfered surface in the tire width direction.

Preferably, the length of the third chamfered surface in the tire circumferential direction is smaller than the length of the first chamfered surface in the tire circumferential direction.

Preferably, a range in the tire circumferential direction of a position of the third chamfered surface does not overlap the ranges in the tire circumferential direction of the positions of the first chamfered surface and the second chamfered surface.

Preferably, the tread pattern further includes: a fourth circumferential main groove extending in the tire circumferential direction and disposed at an interval from the third circumferential main groove on an opposite side of the third circumferential main groove from the second circumferential main groove; a plurality of fourth sipes that extend in the tire width direction within a region of the third land portion between the fourth circumferential main groove and the third circumferential main groove and that are disposed at intervals in the tire circumferential direction; and a fourth chamfered surface having a tread surface of the third land portion inclined toward the fourth circumferential main groove in an end portion in the tire width direction on a fourth circumferential main groove side of the third land portion, the fourth chamfered surface being provided in plurality in the tire circumferential direction, and the fourth sipes opening to the plurality of the fourth chamfered surfaces without reaching a groove wall of the fourth circumferential main groove, and a length of the fourth chamfered surface in the tire circumferential direction is greater than a length of the fourth chamfered surface in the tire width direction.

Preferably, the length of the fourth chamfered surface in the tire circumferential direction is greater than the length of the third chamfered surface in the tire circumferential direction.

Preferably, a range in the tire circumferential direction of a position of the fourth chamfered surface does not overlap the ranges in the tire circumferential direction of the positions of the first chamfered surface, the second chamfered surface, and the third chamfered surface.

Preferably, a total number of the first sipes and the second sipes is greater than a number of the fourth sipes.

Preferably, the tread pattern further includes, in the region of the third land portion, a circumferential narrow groove extending in the tire circumferential direction, having a groove width smaller than a groove width of the circumferential main groove, and disposed at an interval from the third circumferential main groove and the fourth circumferential main groove, and the fourth sipe and the fourth chamfered surface are disposed in a region between the fourth circumferential main groove and the circumferential narrow groove in the region of the third land portion.

Preferably, the region of the first land portion and the region of the third land portion are disposed on opposite sides of the tire centerline in the tire width direction, and the tread pattern has a vehicle mounting orientation designated such that the region of the first land portion is disposed on a vehicle outer side.

Preferably, the tread pattern does not include lug grooves extending in the tire width direction within the region of the land portion.

The tire of the aspect described above can suppress degradation of wet performance while improving noise performance.

DETAILED DESCRIPTION

Overall Description of Tire

Hereinafter, a tire of the present embodiment is described. The tire of the present technology is preferably a pneumatic tire, and the tire of the present embodiment is a pneumatic tire. A pneumatic tire is a tire including a cavity region surrounded by a tire and a rim, the cavity region being filled with air. Note that in the tire of the present embodiment, the cavity region surrounded by a tire and a rim may be filled with an inert gas such as nitrogen or other gas. The present embodiment includes various embodiments described below.

Figure 1:
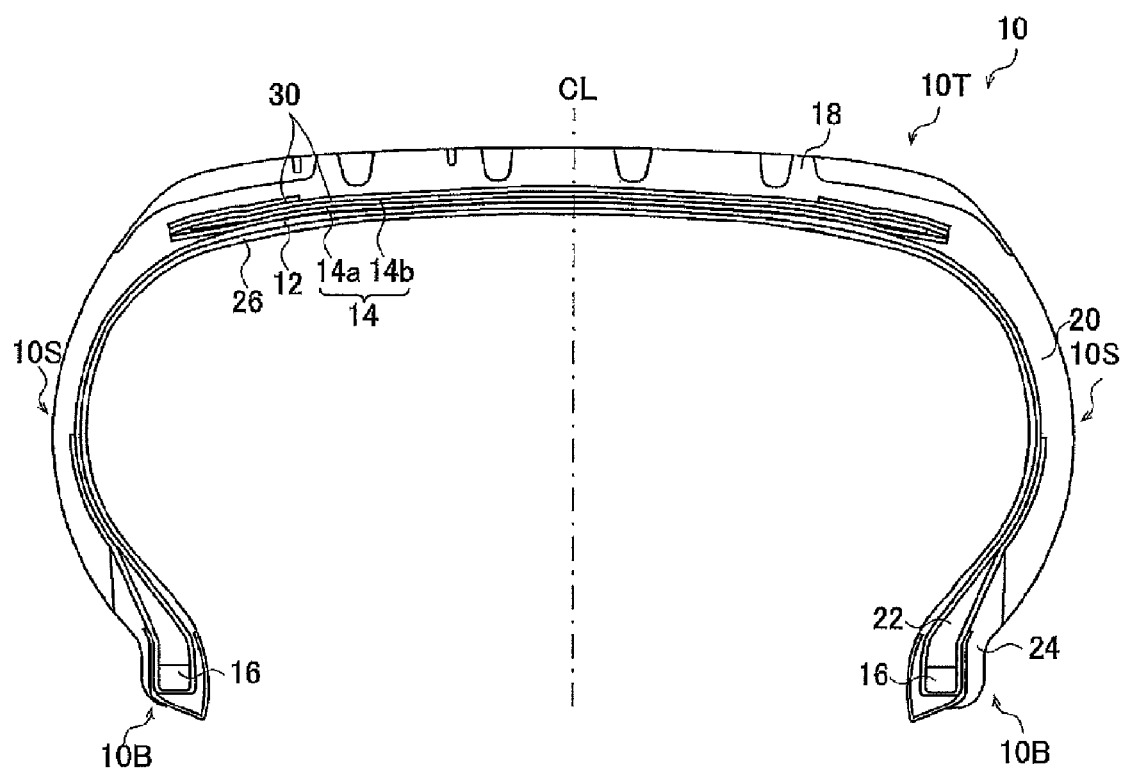
FIG. 1 is a diagram illustrating an example of a profile cross-section of a tire according to the present embodiment.

FIG. 1 is a tire cross-sectional view illustrating an example of a profile cross-section of a pneumatic tire (hereinafter referred to simply as "tire") 10.

The tire 10 is, for example, a tire for a passenger vehicle. "Tire for a passenger vehicle" refers to a tire specified in Chapter A of the JATMAYEAR BOOK 2012 (standards of The Japan Automobile Tyre Manufacturers Association, Inc.). The tire 10 can also be applied to a tire for a light truck specified in Chapter B and a tire for a truck and a bus specified in Chapter C.

Tire width direction is a direction parallel to a rotation axis of a tire. "Outer side in the tire width direction" is a side distant from a tire centerline CL (tire equator line) representing a tire equatorial plane in the tire width direction, Additionally, "inner side in the tire width direction" is a side closer to the tire centerline CL in the tire width direction. Tire circumferential direction is a direction of rotation about the rotation axis of a tire. "Tire radial direction" is a direction orthogonal to the rotation axis of a tire. "Outer side in the tire radial direction" refers to a side away from the rotation axis. Similarly, "inner side in the tire radial direction" refers to a side closer to the rotation axis.

Tire Structure

The tire 10 includes a tread portion 10T including a tread pattern, a pair of bead portions 10B, and a pair of side portions 10S provided in two sides of the tread portion 10T and connected to the pair of bead portions 10B and the tread portion 10T.

The tire 10 includes a carcass ply 12, a belt, 14, and a bead core 16 as framework members and mainly includes, around the framework members, a tread rubber member 18, a side rubber member 20, bead filler rubber members 22, rim cushion rubber members 24, and an innerliner rubber member 26. The carcass ply 12 is formed of a carcass ply member that is made of organic fibers covered with rubber and wound between a pair of the bead cores 16 having an annular shape into a toroidal shape. The carcass ply 12 is wound around the bead cores 16 and extends to an outer side in the tire radial direction. The belt 14 is provided in an outer side of the carcass ply 12 in the tire radial direction and includes two belt members 14a, 14b. The belt 14 includes a member made of a steel cord that is covered with rubber and inclined at a predetermined angle, for example, at from 20 to 30 degrees, with respect to the tire circumferential direction. The belt member 14a of an inner layer has a larger width in the tire width direction than the width of the belt member 14b of an outer layer. The steel cords of the two belt members 14a, 14b are inclined in opposite directions. As such, the belt members 14a, 14b are crossing layers serving to suppress expansion of the carcass ply 12 due to pressure of the air in the tire.

The tread rubber member 18 is provided in an outer side of the belt 14 in the tire radial direction. The side rubber members 20 are connected to two end portions of the tread rubber member 18 and form the side portions 10S. The rim cushion rubber members 24 are provided at ends in an inner side of the side rubber member 20 in the tire radial direction and come into contact with a rim on which the tire 10 is mountable. Each of the bead filler rubber members 22 is provided in an outer side of each of the bead cores 16 in the tire radial direction and is interposed between a portion of the carcass layer 12 prior to being wound around the bead core 16 and a portion of the carcass ply 12 wound around the bead core 16. The innerliner rubber member 26 is provided on an inner surface of the tire 10 facing a tire cavity region that is filled with air and is surrounded by the tire 10 and the rim.

Additionally, two belt covers 30 made of organic fiber covered with rubber are provided between the belt member 14b and the tread rubber member 18. The two belt covers 30 cover the belt 14 from the outer side of the belt 14 in the tire radial direction.

Tread Pattern

Figure 2:
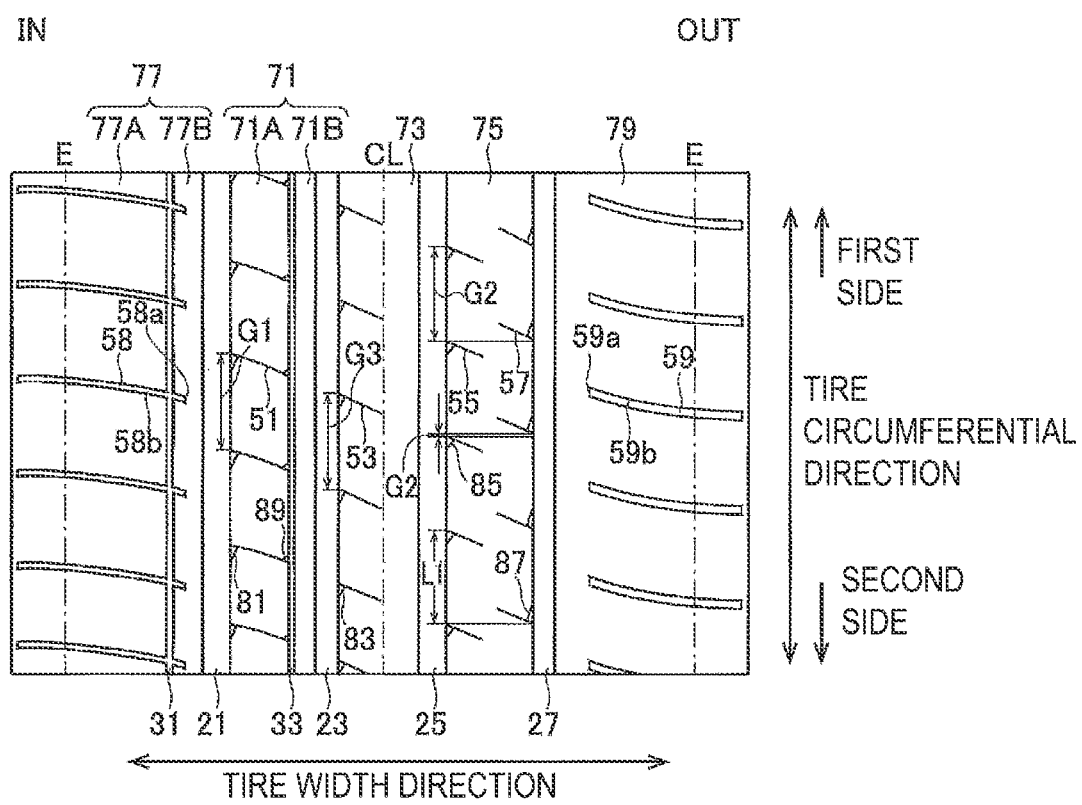
FIG. 2 is a diagram illustrating an example of a tread pattern of the tire of FIG. 1.

FIG. 2 is a diagram illustrating a portion developed into a plan view of an example of a tread pattern of the tire 10 of FIG. 1.

The tread pattern of the example illustrated in FIG. 2 includes a first outer main groove 21 (fourth circumferential main groove), a first inner main groove 23 (third circumferential main groove), a second inner main groove 25 (second circumferential main groove), and an second outer main groove 27 (first circumferential main groove) as circumferential main grooves extending in the tire circumferential direction.

The first outer main groove 21 and the first inner main groove 23 are provided in a first half-tread region on one side (left side in FIG. 2) of the tire centerline CL in the tire width direction and are disposed at intervals from each other in the tire width direction.

The second inner main groove 25 and the second outer main groove 27 are provided in a second half-tread region on the other side (right side in FIG. 2) in the tire width direction and are disposed at intervals from each other in the tire width direction.

Herein, main groove means a groove having a groove depth of, for example, from 6.5 to 9.0 mm and a groove width of, for example, from 5.0 to 15.0 mm.

The number of main grooves provided in the tread pattern is four in the example illustrated in FIG. 2, but may be, for example, three or five. A configuration including three main grooves differs from the example illustrated in FIG. 2 in that the first inner main groove 23 and the second inner main groove 25 are substituted by one circumferential main groove.

The tread pattern according to the example illustrated in FIG. 2 further includes narrow grooves 31, 33 as two circumferential narrow grooves extending in the tire circumferential direction. The narrow grooves 31, 33 each have a smaller groove width than the main grooves 21, 23, 25, 27. The narrow grooves 31, 33 each have a smaller groove depth than the main grooves 21, 23, 25, 27. The groove depths of the narrow grooves 31, 33 are, for example, from 1.0 to 5.0 mm and the groove widths of the narrow grooves 31, 33 are, for example, from 0.8 to 3.0 mm.

The narrow groove 31 is provided in a shoulder region 77 of the tread pattern on an outer side of the first outer main groove 21 in the tire width direction.

The narrow groove 33 is provided in a first middle region (region of the third land portion) 71 between the first outer main groove 21 and the first inner main groove 23. The narrow groove 33 is located, within the first middle region 71, on a first inner main groove 23 side of the center in the tire width direction of the first middle region 71.

According to an embodiment, the circumferential narrow groove is preferably not provided in a second middle region 75 (region of the first land portion) and a center region 73 (region of the second land portion), which are described below, in the tread pattern according to the example illustrated in FIG. 2, the circumferential narrow groove is not provided in a shoulder region 79, which is described below.

The tread pattern of the example illustrated in FIG. 2 further includes a first middle sipe 51 (fourth sipe), a center sipe 53 (third sipe), a second middle sipe 55 (second sipe), and a second middle sipe 57 (third sipe). The first middle sipe 51, the center sipe 53, and the second middle sipes 55, 57 secure edge components extending in the tire width direction, thus improving an edge effect against a force in a front-rear direction (direction parallel to the tire circumferential direction on a ground contact surface). Herein, sipe refers to a sipe having a sipe depth of, for example, from 2.0 to 7.5 mm and a sipe width of, for example, from 0.3 to 1.0 mm.

A plurality of the first middle sipes 51 are disposed at intervals in the tire circumferential direction in the first middle region 71, communicate with the first outer main groove 21, extend in the tire width direction, and close within the first middle region 71.

A plurality of the center sipes 53 are disposed at intervals in the tire circumferential direction in the center region 73 between the first inner main groove 23 and the second inner main groove 25, communicate with the first inner main groove 23, extend in the tire width direction, and close within the center region 73.

A plurality of the second middle sipes 55 are disposed at intervals in the tire circumferential direction in the second middle region 75 between the second inner main groove 25 and the second outer main groove 27, communicate with the second inner main groove 25, extend in the tire width direction, and close within the second middle region 75.

A plurality of the second middle sipes 57 are disposed at intervals in the tire circumferential direction in the second middle region 75, communicate with the second outer main groove 27, extend in the tire width direction in the second middle region 75, and close within the second middle region 75 without reaching the second inner main groove 25.

According to an embodiment, the second middle region 75 may include only either the second middle sipes 55 or the second middle sipes 57.

The tread pattern according to the example illustrated in FIG. 2 further includes shoulder lug grooves 58, 59.

A plurality of the lug grooves 58 are disposed at intervals in the tire circumferential direction in the shoulder region 77 on an outer side in the tire width direction of the first outer main groove 21, extend in the tire width direction from the outer side in the tire width direction toward the first outer main groove 21 within an outer region 77A, in the shoulder region 77, located on an outer side of the narrow groove 31 in the tire width direction, intersect the narrow groove 31, and close within an inner region 77B between the narrow groove 31 and the main groove 21 without reaching the first outer main groove 21.

A plurality of the lug grooves 59 are disposed at intervals in the tire circumferential direction in a shoulder region 79 on an outer side in the tire width direction of the second outer main groove 27, extend in the tire width direction from the outer side in the tire width direction toward the main groove 27 within the shoulder region 79, and close within the region 79 without reaching the main groove 27.

Note that the regions 77A, 79 include ground contact edges E in the tire width direction, "Ground contact edges" refer to two ends in the tire width direction of a ground contact surface where the tire 10 mounted on a regular rim, inflated to a regular internal pressure, and loaded with 88% of a regular load is brought into contact with a horizontal surface. "Regular rim" refers to a "measurement rim" defined by the Japan Automobile Tyre Manufacturers Association Inc, (JATMA), a "Design Rim" defined by the Tire and Rim Association, Inc. (TRA), or a "Measuring Rim" defined by the European Tyre and Rim Technical Organisation (ETRTO). "Regular internal pressure" refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, a maximum value in "TIRE LOAD LIMITS AT VARIOUS COLD INFLATION PRESSURES" defined by TRA, or a "LOAD CAPACITY" defined by ETRTO.

The shoulder lug grooves 58, 59 include closed ends 58*a*, 59*a* of the shoulder lug grooves 58, 59, and main groove side portions 58*b*, 59*b*, which are located on an outer main groove 21 side and an outer main groove 27 side, respectively, of the ground contact edges E, extend at an incline with respect to the tire width direction.

The tread pattern of the example illustrated in FIG. 2 further includes a first middle chamfered surface 81, a center chamfered surface 83, and second middle chamfer surfaces 85, 87.

An end portion in the tire width direction of the ripe 51, which communicates with the first outer main groove 21, is adjacent to portions of a land portion. The first middle chamfered surface 81 is a surface having a tread surface of one of the portions of the land portion inclined toward the first outer main groove 21. A plurality of the first middle chamfered surfaces 81 are provided at intervals in the tire circumferential direction, and the first middle sipes 51 open thereto without reaching a groove wall of the first outer main groove 21.

An end portion in the tire width direction of the sipe 53, which communicates with the first inner main groove 23, is adjacent to portions of a land portion. The center chamfered surface 83 is a surface having a tread surface of one of the portions of the land portion inclined toward the first inner main groove 23. A plurality of the center chamfered surfaces 83 are provided at intervals in the tire circumferential direction, and the center sipes 53 open thereto without reaching a groove wall of the first inner main groove 23.

An end portion in the tire width direction of the sipe 55, which communicates with the second inner main groove 25, is adjacent to portions of a land portion. The second middle chamfered surface 85 is a surface having a tread surface of one of the portions of the land portion inclined toward the second inner main groove 25. A plurality of the second middle chamfered surfaces 85 are provided at intervals in the tire circumferential direction, and the second middle sipes 55 open thereto without reaching a groove wall of the second inner main groove 25.

An end portion in the tire width direction of the sipe 57, which communicates with the second outer main groove 27, is adjacent to portions of a land portion. The second middle chamfered surface 87 is a surface having a tread surface of one of the portions of the land portion inclined toward the second outer main groove 27. A plurality of the second middle chamfered surfaces 87 are provided at intervals in the tire circumferential direction, and the second middle sipes 57 open thereto without reaching a groove wall of the second outer main groove 27.

According to the present embodiment, at least one of the chamfered surfaces 81, 83, 85, 87 has a greater length in the tire circumferential direction than in the tire width direction. The present embodiment includes the sipes 51, 53, 55, 57 in the first middle region 71, the center region 73, and the second middle region 75, and thus has a smaller groove volume and a more excellent noise performance than a configuration including lug grooves instead of the sipes 51, 53, 55, 57, On the other hand, the embodiment includes at least one of the chamfered surfaces 81, 83, 85, 87 in the first middle region 71, the center region 73, and the second middle region 75, and thus has more edge components that contact road surface and a greater edge effect than a configuration not including the chamfered surface. This suppresses a decrease in steering stability performance on wet road surfaces (wet performance), which is caused h a decrease in drainage properties, which in turn is caused by providing the sipes 51, 53, 55, 57 instead of the lug grooves. Further, as described above, the present embodiment includes the sipes 51, 53, 55, 57, and thereby ensures edge components that have an effect on a force in the front-rear direction (tire circumferential direction). Thus, the present embodiment, with the chamfered surfaces 81, 83 being longer in the tire circumferential direction than in the tire width direction, can ensure edge components that have an effect on a lateral force while ensuring edge components that have an effect on a force in the front-rear direction, and can obtain the effect of improving wet performance with respect to forces in various directions, the forces being received from road surface. This increases the effect of suppressing a decrease in wet performance. That is, compared to a configuration including lug grooves instead of the sipes 51, 53, 55, 57, the present embodiment suppresses degradation of wet performance while improving noise performance. Note that the present embodiment, which includes at least one of the chamfered surfaces 81, 83, 85, 87 in the first middle region 71, the center region 73, and the second middle region 75, has a greater groove volume than an embodiment without the chamfered surface, but the amount of an increase is less than is the case with, for example, an embodiment including notches (grooves in a lateral direction, the grooves each having a relatively short length in their extension direction), and the effect thereof on noise performance is small. According to an embodiment, at least two, three, or all of the chamfered surfaces 81, 83, 85, 87 are preferably longer in the tire circumferential direction than in the tire width direction.

According to an embodiment, the sipes 51, 53, 55, 57 open to the chamfered surfaces 81, 83, 85, 87, respectively, and the length in the tire circumferential direction of each of the chamfered surfaces 81, 83, 85, 87 is preferably from 5 to 50% of the interval between a corresponding one of pairs of the sipes 51, 53, 55, 57, the pairs being each adjacent in the tire circumferential direction. The chamfered surfaces that are longer in the tire circumferential direction than this percentage may cause degradation in noise performance due to an increase in groove volume, and may have an adverse effect on wet performance due to a decrease in the rigidity of the land portions. Further, the chamfered surfaces that are smaller in the tire circumferential direction than this percentage lessen the effect of improving wet performance.

According to an embodiment, the ratio of the length of each of the chamfered surfaces 81, 83, 85, 87 in the tire width direction to the length thereof in the tire circumferential direction is preferably larger than 1, and 10 or less, and more preferably 1.5 or more and 8 or less.

According to an embodiment, the lengths of the second middle chamfered surfaces 85, 87 in the tire circumferential direction are preferably mutually different. According to another embodiment, the lengths in the tire circumferential direction of the first middle chamfered surface 81 and the center chamfered surface 83 are preferably mutually different. In these embodiments, of the chamfered surfaces 85, 87 or of the chamfered surfaces 81, 83, one that is longer in the tire circumferential direction can yield the effect of improving wet performance by edge components having an effect on a lateral force, and the other that is shorter in the tire circumferential direction can yield the effect of improving noise performance by a reduction in groove volume. The length in the tire circumferential direction of the chamfered surface having the longest length in the tire circumferential direction, of the chamfered surfaces having different lengths in the tire circumferential direction, is preferably from 1.2 to 3 times, and more preferably from 1.5 to 2 times, the length in the tire circumferential direction of the chamfered surface having the shortest length in the tire circumferential direction.

According to an embodiment, of the chamfered surfaces 85, 87 or of the chamfered surfaces 81, 83, one that is farther from the centerline CL preferably has a greater length in the tire circumferential direction than the other that is closer to the tire centerline CL. This embodiment yields a large effect of improving noise performance in a region at or near the tire centerline CL, and a large effect of improving wet performance in a region away from the tire centerline CL, and thus can effectively obtain the effect of suppressing a decrease in wet performance while improving noise performance as described above.

According to an embodiment, the ranges in the tire circumferential direction of positions of the second chamfered surfaces 85, 87 preferably do not overlap each other. Thus, with the chamfered surfaces 85, 87 being dispersed in the tire circumferential direction, effects of the chamfered surfaces 85, 87 on noise performance can be dispersed. For the same reason, the ranges in the tire circumferential direction of positions of the chamfered surfaces 83, 85, 87 preferably do not overlap each other. Also, the ranges in the tire circumferential direction of positions of the chamfered surfaces 81, 83, 85, 87 preferably do not overlap each other.

Figure 3:
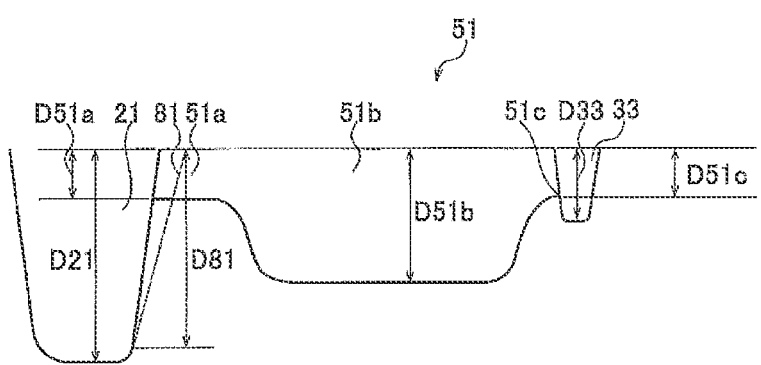
FIG. 3 is a diagram illustrating a cross-section of a region between a first outer main groove and a narrow groove.
Figure 4:
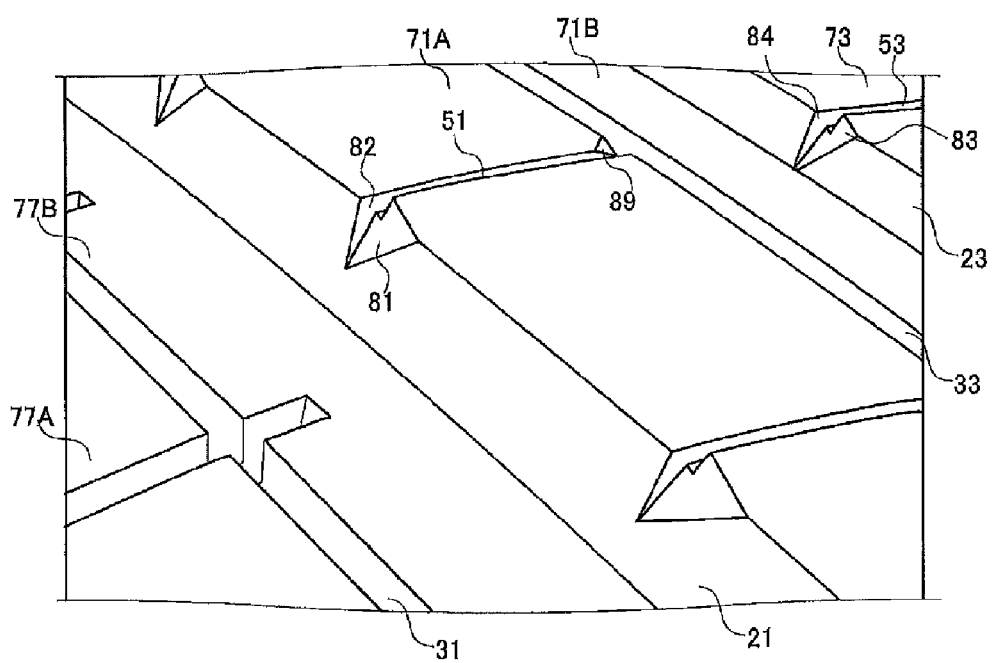
FIG. 4 is a perspective view illustrating an embodiment of a chamfered surface.

According to an embodiment, the maximum depths of the chamfered surfaces 81, 83, 85, 87 are preferably larger than the depths (maximum depths) of the sipes 51, 53, 55, 57, respectively, which open to the chamfered surfaces 81, 83, 85, 87, respectively. The chamfered surfaces 81, 83, 85, 87 are inclined toward the main grooves 21, 23, 25, 27, respectively, and are deepest at the groove walls of the main grooves 21, 23, 25, 27, respectively. FIG. 3 illustrates a maximum depth D81 of the chamfered surface 81, FIG. 3 is a diagram illustrating a cross-section of a region between the first outer main groove 21 and the narrow groove 33. The maximum depths of the chamfered surfaces 81, 83, 85, 87 are thus larger than the depths of the sipes 51, 53, 55, 57, respectively, and the sipes 51, 53, 55, 57, as illustrated in FIG. 4, do not reach the groove walls of the main grooves 21, 23, 25, 27, respectively, open to the chamfered surfaces 81, 83, 85, 87, respectively, and close within the chamfered surfaces 81, 83, 85, 87, respectively. That is, the sipes 51, 53, 55, 57, though not connected (directly open) to the main grooves 21, 23, 25, 27, respectively, are open to the chamfered surfaces 81, 83, 85, 87, respectively, as described above, and are thus in communication with the main grooves 21, 23, 25, 27, respectively. FIG. 4 illustrates an embodiment of the chamfered surfaces 81, 83 as representing the chamfered surfaces 81, 83, 85, 87. In an embodiment in which the sipes 51, 53, 55, 57 are not connected to the main grooves 21, 23, 25, 27, respectively, in contrast to an embodiment in which the sipes 51, 53, 55, 57 are connected to the main grooves 21, 23, 25, 27, respectively, too much deformation of the land portion due to a decrease in rigidity is suppressed, and an appropriate rigidity of the land portions is obtained, Such an embodiment contributes to improving wet performance.

According to an embodiment, the maximum depths of the chamfered surfaces 81, 83, 85, 87 are preferably equal to each other.

According to an embodiment, a tire circumferential direction side where the second middle chamfered surface 85 is located with respect to the second middle sipe 55 (second side in FIG. 2) is preferably opposite a tire circumferential direction side where the second middle chamfered surface 87 is located with respect to the second middle sipe 57 (first side in FIG. 2). According to another embodiment, a tire circumferential direction side where the first middle chamfered surface 81 is located with respect to the first middle sipe 51 (second side in FIG. 2) is preferably the same side as a tire circumferential direction side where the center chamfered surface 83 is located with respect to the center sipe 53 (second side in FIG. 2).

According to an embodiment, as illustrated in FIG. 4, the chamfered surfaces 81, 83, 85, 87 preferably each have a substantially triangular shape that decreases in length in the tire width direction from one side in the tire circumferential direction to the other side. This can minimize the effect of the chamfered surfaces 81, 83, 85, 87 on noise performance. The apexes of the triangle of the substantially triangular shape are located in the groove wall of the main groove, on the ground contact surface of the land portion in contact with the groove wall, and at the boundary between the ground contact surface and the groove wall.

According to an embodiment, each of the sipes 51, 53, 55, 57 preferably opens to a portion of a corresponding one of the chamfered surfaces 81, 83, 85, 87, the portion being where the chamfered surface is longest in the tire width direction (a portion that forms an apex of a substantially triangular shape in FIG. 4).

According to an embodiment, the sipes 51, 53, 55, 57 open to the chamfered surfaces 81, 83, 85, 87, respectively, and each of the sipes 51, 53, 55, 57 preferably has a raised bottom portion (main groove side communicating portion to be described below) at an opening end portion of the sipe, the raised bottom portion being shallower than the maximum depth of the sipe. An embodiment in which the sipes 51, 53, 55, 57 are not connected to the main grooves 21, 23, 25, 27 increases the effect of obtaining the appropriate rigidify of the land portions.

According to an embodiment, as illustrated in FIG. 4, the tread pattern further includes, in the land portions of the first middle region 71, the center region 73, and the second middle region 75, wall surfaces of the land portions that are adjacent to the chamfered surfaces 81, 83, 85, 87. The wall surfaces continuously extend from the wall surfaces of the sipes 51, 53, 55, 57, from opening end portions of the sipes 51, 53, 55, 57 to the wall surfaces of the main grooves 21, 23, 25, 27, respectively, the sipes 51, 53, 55, 57 opening to the chamfered surfaces 81, 83, 85, 87, respectively, and the chamfered surfaces 81, 83, 85, 87 being inclined to the main grooves 21, 23, 25, 27, respectively. FIG. 4 illustrates wall surfaces 82, 84 as representing the wall surfaces. The wall surfaces preferably extend without being inclined with respect to the tire radial direction. This reduces groove volume and contributes to improving noise performance, compared to an embodiment in which the wall surfaces are inclined with respect to the tire radial direction. This also improves the effect of cutting water film and contributes to improving wet performance, compared to an embodiment in which the wall surfaces are inclined with respect to the tire radial direction.

According to an embodiment, the wall surface preferably extends along the extension direction of each of the sipes 51, 53, 55, 57, which open to the chamfered surfaces 81, 83, 85, 87, respectively. In an embodiment in which the wall surfaces extend away from the chamfered surfaces 81, 83, 85, 87 with respect to the extension directions of the sipes 51, 53, 55, 57, respectively (such that the inclination angles with respect to the tire width direction increase), edge components that have an effect on a lateral force may decrease, and the effect of suppressing a decrease in wet performance may decrease. According to an embodiment, the inclination angles of the sipes 51, 53, 55, 57 with respect to the tire width direction are preferably 45 degrees or less. The edge components having an effect on a lateral force are ensured by the chamfered surfaces 81, 83, 85, 87, and an edge effect can be enhanced with respect to a force in the front-rear direction by reducing inclination angles of the sipes 51, 53, 55, 57. The inclination angles are preferably from 10 to 35 degrees.

According to an embodiment, the tread pattern preferably further includes a chamfered surface 89 having a tread surface inclined toward the narrow groove 33 in an end portion in the tire width direction on a narrow groove 33 side of the region 71A including the first middle sipes 51, the region 71A being one of two regions divided in the tire width direction by the narrow groove 33 in the first middle region 71. The chamfered surface 89 is provided in plurality in the tire circumferential direction, and is adjacent in the tire circumferential direction to a connection end portion of the first middle sipe 51 to the narrow groove 33. According to an embodiment, the maximum depth of the chamfered surface 89 is preferably smaller than the depth of the first middle sipe 51. That is, the first middle sipe 51 preferably connects (directly opens) to the narrow groove 33.

According to an embodiment, the length of the chamfered surface 89 in the tire circumferential direction is preferably shorter than the lengths of the chamfered surfaces 81, 83, 85, 87 in the tire circumferential direction. According to another embodiment, the length of the chamfered surface 89 in the tire circumferential direction and the length in the direction along the extension direction of the first middle sipe 51 are preferably equal.

According to an embodiment, the chamfered surface 81 and the chamfered surface 89 are preferably located on opposite sides of the first middle sipe 51 in the tire circumferential direction (second side and first side in FIG. 2).

According to an embodiment, the tread pattern preferably has a vehicle mounting orientation designated such that the second half-tread region is disposed on a vehicle outer side ("out" side illustrated in FIG. 2) of the first half-tread region. In an embodiment in which the second half-tread region, which has a smaller groove area ratio than the first half-tread region, is disposed on the vehicle outer side, noise performance improves.

Number of Intervals of Middle Sipes

According to an embodiment, the number of intervals G2 of the second middle sipes 55, 57 adjacent in the tire circumferential direction (hereinafter referred to as the intervals G2 of the second middle sipes 55, 57) is preferably larger than the number of intervals G1 of the first middle sipes 51 adjacent in the tire circumferential direction (hereinafter referred to as the intervals G1 of the first middle sipes 51). The intervals of the sipes adjacent in the tire circumferential direction refers to intervals of positions where lines extending the sipes along the shape of the sipes extending on the tread surface intersect the groove wall of the main groove in communication with the sipes (hereinafter the communicating positions), the positions being adjacent in the tire circumferential direction. Two adjacent communicating positions may be located in the same main groove or in different main grooves. Thus, the intervals between second middle sipes having the communicating positions at the same positions in the tire circumferential direction in the region are not included in the "intervals of the sipes adjacent in the tire circumferential direction".

In this embodiment, the first middle region 71 and the second middle region 75 include the sipes 51, 55, 57, and this reduces groove volume and improves noise performance, compared to a configuration including lug grooves instead of the sipes 51, 55, 57. On the other hand, the first middle region 71 including the narrow groove 33 compensates for degradation of drainage properties, which is caused by providing the sipes 51 instead of the lug grooves, and suppresses degradation of wet performance. Additionally, in the second middle region 75, as described above, the number of intervals G2 of the second middle sipes 55, 57 is larger than the number of intervals G1 of the first middle sipes 51, and this reduces the rigidity of the land portion of the second middle region 75 and makes the same easily deformable and more likely to follow road surface. Thus, in the second middle region 75, adhesion friction with road surface is large, and the effect of suppressing degradation of wet performance increases. That is, this embodiment suppresses degradation of wet performance while improving noise performance, compared to a configuration including lug grooves instead of the sipes 51, 55, 57. In this embodiment, two middle regions 71, 75 differ in shape and have different functions with respect to wet performance, and this yields the effect of suppressing degradation in wet performance. Thus, in this embodiment, the tread pattern is asymmetric with respect to the tire centerline CL.

Here, in a configuration in which the number of intervals G2 of the second middle sipes 55, 57 is equal to or less than the number of intervals G1 of the first middle sipes 51, the rigidity of the second middle region 75 is too high, the land portion is not easily deformed, and followability to road surface is not excellent. Thus, a force to grip road surface by variation in the force received from road surface is insufficient.

According to an embodiment, the tread pattern preferably does not include lug grooves in the first middle region 71 that communicate with or connect to at least one of the first outer main groove 21 and the first inner main groove 23 and extend in the tire width direction, or lug grooves in the second middle region 75 that communicate with or connect to at least one of the second outer main groove 27 and the second inner main groove 25 and extend in the tire width direction. This reduces groove volume and improves noise performance. According to another embodiment, the tread pattern preferably does not include lug grooves in the center region 73 that communicate with or connect to at least one of the first inner main groove 23 and the second inner main groove 25 and extend in the tire width direction. Lug groove is a groove having a component extending in the tire width direction and having a groove width of 1.5 mm or more.

According to an embodiment, the second middle sipes preferably include, as in the example illustrated in FIG. 2, the second middle sipes 55 communicating with the second inner main groove 25 and the second middle sipes 57 having communicating positions with the second outer main groove 27 in the tire circumferential direction at different positions from communicating positions of the second middle sipes 55 with the second inner main groove 25. Thus, in a configuration in which the second middle region 75 includes both the sipes communicating with the second inner main groove 25 and the sipes communicating with the second outer main groove 27, the balance of the rigidity of the land portion in the second middle region 75 in the tire width direction improves, and the land portion can easily follow various changes in the force received from road surface. The percentage of the number of second middle sipes 55 and second middle sipes 57 to the total number of second middle sipes is preferably from 20 to 80%, and preferably from 30 to 70%.

This embodiment preferably further includes, according to another embodiment, the second middle sipes 57 disposed one by one between the second middle sipes 55 adjacent in the tire circumferential direction. Accordingly, the balance of the rigidity in the tire width direction of the land portion of the second middle region 75 particularly improves. The percentages described above are preferably 50% each.

In an embodiment in which a length L1 is a length along the tire circumferential direction between two connection positions at which two second middle sipes 55 adjacent in the tire circumferential direction communicate with the second circumferential main groove 25, a communicating position of the second middle sipe 57 with the second outer main groove 27, as illustrated in FIG. 2, is preferably within the range of from 50 to 97% of the length L1 from one of the two communicating positions (first side in FIG. 2), and more preferably within the range of from 70 to 95% thereof.

This increases an effect of reducing tire noise. Note that "one of the two communicating positions" refers to a communicating position of the second middle sipe 55 with the second inner main groove 25, the second middle sipe 55 including a closed end within a range in the tire circumferential direction between the two communicating positions.

These embodiments are further configured, according to another embodiment, such that the direction connecting two ends of the second middle sipe 55 in its extending direction and the direction connecting two ends of the second middle sipe 57 in its extending direction are preferably inclined, as a direction from one end to the other in the tire width direction, toward the same side in the tire circumferential direction with respect to the tire width direction. This can suppress, in the second middle region 75, concentration of locations where the rigidity of the land portion is low. In the example illustrated in FIG. 2, the two directions are inclined to a first side (upper side in FIG. 2) in the tire circumferential direction with respect to the tire width direction. According to another embodiment, the first middle sipe 51 and the second middle sipes 55, 57 preferably have the relationship of being inclined to the same side as described above, and more preferably the first middle sipe 51, the center sipe 53, and the second middle sipes 55, 57 have the relationship of being inclined to the same side as described above.

According to an embodiment, the length of the interval G2 of the second, middle sipes 55, 57 is preferably different between the intervals adjacent in the tire circumferential direction. FIG. 2 illustrates a plurality of the intervals G2 having different lengths. This yields the effect of dispersing the frequency of pattern noise, contributing to improving noise performance.

According to an embodiment, the first middle sipes 51 preferably connect to the narrow groove 33. This increases the drainage properties in the first middle region 71.

This embodiment is further configured, according to another embodiment, such that as illustrated in FIG. 3, a sipe depth D51c of a narrow groove side connection portion 51c of the first middle sipe 51 is smaller than a groove depth D33 of the narrow groove 33, and a sipe depth D51b of an intermediate portion 51b of the first middle sipe 51 is greater than the groove depth D33 of the narrow groove 33, the narrow groove side connection portion connecting to the narrow groove 33, and the intermediate portion being located between the first outer main groove 21, which communicates with the first middle sipe 51, and the narrow groove side connection portion 51c. The narrow groove side connection portion 51c having such a raised bottom portion can suppress a decrease in rigidity at a connection position of the first middle sipe 51 to the narrow groove 33. Further, the intermediate portion 51b of the first middle sipe 51 being deeper than the narrow groove 33 improves the water absorbency of the first middle sipe 51 and contributes to improving wet performance. FIG. 3 is a diagram illustrating a cross-section of a region in the tire width direction of the first middle region 71, the region being along the extension direction of the first middle sipe 51. FIG. 3 omits a third chamfered surface, which is described below.

These two embodiments are preferably further configured, according to another embodiment, such that a sipe depth D51a of a main groove side communicating portion 51a of the first middle sipe 51 is preferably smaller than the groove depth D33 of the narrow groove 33, the main groove side communicating portion communicating with the first outer main groove 21. The main groove side communicating portion 51a having such a raised bottom portion can suppress a decrease in rigidity in a communicating position of the first middle sipe 51 with the first outer main groove 21.

The sipe depth D51c of the narrow groove side connection portion 51c and the sipe depth D51a of the main groove side communicating portion 51a are preferably from 20 to 50% of the sipe depth D51b of the intermediate portion 51b, and more preferably from 30 to 40% thereof.

A groove depth D21 of the first outer main groove 21, the sipe depth D51b of the intermediate portion 51b, the groove depth D33 of the narrow groove 33, and the sipe depths D51c, D51a of the narrow groove side connection portion 51c and the main groove side communicating portion 51a preferably become smaller in this order. That is, D21>D51b>D33>D51c, D51a is preferable. D51c and D51a may be different from each other, but are preferably equal.

According to an embodiment, the first middle sipe 51 preferably extends in a curved shape so as to bulge roundly to one side in the tire circumferential direction on the tread surface. This suppresses movement, in the first middle region 71, of portions on two sides of the first middle sipe 51 in the tire circumferential direction to be displaced from each other in the tire width direction when a lateral force is applied, and this contributes to improving wet performance. In the example illustrated in FIG. 2, the first middle sipe 51 extends so as to form an arc shape that bulges, on the tread surface, to the first side in the tire circumferential direction. The radius of curvature of the arc shape of the first middle sipe 51 is preferably from 50 to 150 mm.

On the other hand, the second middle sipes 55, 57 and the center sipe 53 preferably extend in a straight line on the tread surface.

This embodiment is preferably further configured, according to another embodiment, such that the length of the first middle sipe 51 in its extension direction is preferably greater than the lengths of the second middle sipes 55, 57 in their extension directions. The number of first middle sipes 51 is smaller than the total number of second middle sipes 55, 57, and such an embodiment contributes to improving the balance of the rigidity of the first middle region 71 and the second middle region 75. Also, this facilitates adjustment of the rigidity of the first middle region 71 to a level between the rigidity of the second middle region 75 and that of the center region 73. Note that the length of the first middle sipe 51 in its extension direction is preferably greater than the length of the center sipe 53 in its extension direction (for example, from 115 to 125% of the length of the center sipe 53 in its extension direction).

According to an embodiment, the second middle sipes 55, 57 each extend in a straight line, and the inclination angle, with respect to the tire width direction, of the direction connecting two ends of the extension direction of the second middle sipe 55 and the inclination angle, with respect to the tire width direction, of the direction connecting two ends of the extension direction of the second middle sipe 57 are preferably different between the second middle sipes 55, 57 that are adjacent in the tire circumferential direction.

According to an embodiment, the number of intervals G2 of the second middle sipes 55, 57 is preferably larger than the number of intervals G3 of the center sipes 53 adjacent in the tire circumferential direction (hereinafter referred to as the intervals G3 of the center sipes 53). That is, the number of intervals G3 of the center sipes 53 is preferably smaller than the number of intervals G2 of the second middle sipes 55, 57. The center region 73 has, in the tread portion, the longest ground contact length in the tire circumferential direction, and thus the ground contact area with road surface is preferably secured according to the embodiment described above.

This embodiment is preferably further configured, according to another embodiment, such that the lengths of the second middle sipes 55, 57 in the tire width direction are preferably from 20 to 50% of the length of the second middle region 75 in the tire width direction, and more preferably from 30 to 40% thereof, and the length of the center sipe 53 in the tire width direction is from 40% to 70% of the length of the center region 73 in the tire width direction, and more preferably from 50 to 60% thereof. This can suppress an excessive decrease in the rigidity of the second middle region 75 and of the center region 73.

Extension Line

Figure 5:
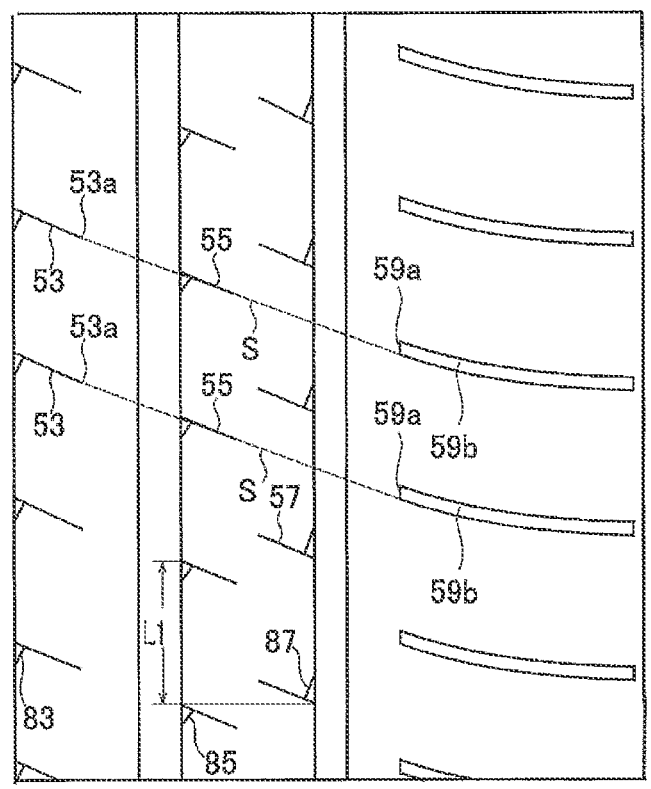
FIG. 5 is a diagram explaining an extension line.

According to an embodiment, as in the example illustrated in FIG. 5 the second middle sipes 55 preferably overlap all of a plurality of extension lines S. The second middle sipe 57 extends between two of the plurality of extension lines S in a direction along the extension line S, the two being adjacent in the tire circumferential direction. FIG. 5 is a diagram explaining the extension lines S, and illustrates two of the extension lines S in dashed lines.

The extension lines S are imaginary lines extending a plurality of the shoulder lug grooves 59 from the closed ends 59a of the plurality of the shoulder lug grooves 59 smoothly along an inclination direction of the main groove side portions 59b toward closed ends 53a of a plurality of the third sipes 53. The main groove side portion 59b is a portion of the shoulder lug groove 59 on a main groove 27 side, the portion including the closed end 59a. The extension line S is a straight line. "Extending smoothly" means that, of angles formed at the closed end 59a of the shoulder lug groove 59 between an inclination direction of the shoulder lug groove 59 with respect to the tire width direction and an extension direction of the extension line S, a smaller one is 10 degrees or less, and preferably 5 degrees or less. Of angles formed at the closed end 53a of the center sipe 53 between an inclination direction of the center sipe 33 and an inclination direction of the extension line S, a smaller one is preferably 10 degrees or less, and more preferably 5 degrees or less. Still more preferably, the two directions are the same.

"Second middle sipes 55 overlap the extension lines S" includes not only an embodiment in which the second middle sipes 55 each contact or intersect the extension line S but also an embodiment in which the second middle sipes 55 each contact or intersect a region twice as distant from the extension line S in a direction orthogonal to the extension line S as the groove width of the main groove side portion 59b of the shout delug groove 59. Further, "second middle sipe 57 extends in a direction along the extension line S" means that the inclination angle of the extension direction of the second middle sipe 57 with respect to the extension line S is 10 degrees or less, preferably 5 degrees or less, and more preferably 0 degrees.

Thus, the shoulder lug groove 59, the second middle sipe 55, and the center sipe 53 overlap the extension line S inclined with respect to the tire width direction, and so the shoulder lug groove 59, the second middle chamfered surface 87, and the second middle chamfered surface 85 are easily dispersed in the tire circumferential direction, contributing to improving noise performance.

On the other hand, the second middle chamfered surface 87 is disposed closer to the shoulder lug groove 59 than the second middle chamfered surface 85. Accordingly, the second middle chamfered surface 87 is disposed between two extension lines S adjacent in the tire circumferential direction, extending along the extension lines S, and thus does not overlap the extension lines S. Since the shoulder lug groove 59 has a large groove volume and generates a loud popping sound, the second middle chamfered surface 87 and the shoulder lug groove 59 are preferably separated from each other in the tire circumferential direction.

According to an embodiment, preferably, each of all the shoulder lug grooves 59 and the center sipes 53 forms an end in the extension direction of one of the plurality of extension lines S, and each of all the second middle sipes 55 overlaps one of the extension lines S, and each of all the second middle sipes 57 extends between one of pairs of the extension lines S adjacent in the tire circumferential direction. Accordingly, an effect of dispersing the second middle chamfered surface 85, the second middle chamfered surface 87, and the shoulder lug groove 59 to mutually different positions in the tire circumferential direction can be obtained across an entire circumference in the tire circumferential direction, and the effect of improving noise performance increases.

According to another embodiment, the range of the second middle chamfered surface 85 along the tire circumferential direction preferably does not overlap the range of the shoulder lug groove 59 along the tire circumferential direction. The second middle chamfered surface 85 and the shoulder lug groove 59 being disposed at mutually different positions in the tire circumferential direction contributes to improving noise performance.

According to an embodiment, ranges in the tire circumferential direction of the extension lines S adjacent in the tire circumferential direction preferably do not overlap each other. An embodiment in which ranges of a couple of the extension lines S along the tire circumferential direction overlap each other is less likely to yield the effect of dispersing the second middle chamfered surface 85, the second middle chamfered surface 87, and the shoulder lug groove 59 in the tire circumferential direction. Thus, the magnitude of the inclination angle of the extension line S with respect to the tire width direction is preferably from 10 to 30 degrees.

According to another embodiment, the center sipe 53, the second middle sipe 55, and the second middle sipe 57 preferably have substantially equal inclination angles with respect to the tire width direction. "Substantially equal" refers to a difference in the inclination angle between the lug grooves being up to 10 degrees, and preferably up to 5 degrees.

According to an embodiment, the first middle sipe 51 preferably overlaps an imaginary straight line (second extension line), not illustrated, extending from a connection position of the center sipe 53 to the first inner main groove 23 to the outer side in the tire width direction (vehicle mounting inner side in FIG. 2) along the inclination direction of the center sipe 53 with respect to the tire width direction, "First middle sipe 51 overlaps the second, extension line" includes not only an embodiment in which the first middle sipe 51 contacts or intersects the second extension line but also an embodiment in which the first middle sipe 51 contacts or intersects a region twice as distant from the extension line S in a direction orthogonal to the extension line S as the groove width of the main groove side portion 58b of the shoulder lug groove 58.

In the tread pattern according to the example illustrated in FIG. 2, no lug grooves and sipes communicating with or connected to the narrow groove 33 or the first inner main groove 23 are provided in the region 71B between the narrow groove 33 and the first inner main groove 23, and a rib extending continuously in the tire circumferential direction is formed therein. Additionally, the region 77B of the shoulder region 77 does not include lug grooves or sipes communicating with or connected to the narrow groove 31 or the main groove 21, and includes a rib extending continuously in the tire circumferential direction. Thus, in a region, disposed on a vehicle inner side, of the tread pattern, two narrow grooves 31, 33 form many edge components extending in the tire circumferential direction, and the rigidity of the two ribs is ensured. This increases steering stability by an inner ring during turning. Preferably, the length (width) of the region 77B in the tire width direction is larger than the width of the region 71B. The narrow groove 31 preferably has a wider groove width than the narrow groove 33.

The tread pattern of the present embodiment is not limited to the tread pattern according to the example illustrated in FIG. 2.

Comparative Examples and Examples

To examine effects of a tire of the present embodiment, the tread pattern of the tire was varied, and wet performance and noise performance were examined. The prototype tires each had a tire size of 235/65R17, were based on the tread pattern illustrated in FIG. 2 and the cross-section profiles illustrated in FIGS. 1, 3, except for specifications indicated in Table 1 and below, and based the chamfered surfaces and wall surfaces on the embodiment illustrated in FIG. 4.

Table 1 indicates an embodiment related to the tread pattern of each of the res and evaluation results thereof.

In the comparative example and examples including chamfered surfaces, the maximum depth of each of the chamfered surfaces 81, 83, 85, 87 is 70% of the groove depth of a corresponding one of the main grooves 21, 23, 25, 27, to which the chamfered surfaces 81, 83, 85, 87 are inclined, respectively.

Examples 2 to 7 include the chamfered surface 89, and the maximum depth thereof was set to 50% of the sipe depth of a raised bottom portion (narrow groove connection portion) of the first middle sipe.

In Table 1, "Number of chamfered surfaces" means the number of chamfered surfaces having mutually different positions in the tire width direction, whereas "chamfered surfaces" in Table 1 does not include the chamfered surface 89.

"Longitudinal lengths of chamfered surfaces 81, 87 and 83, 85" means a size relationship between the length in the tire circumferential direction of the chamfered surfaces 81, 87 and the length in the tire circumferential direction of the chamfered surfaces 83, 85. "81, 87=83, 85" means that both of the lengths are equal, whereas "81,87>83, 85" means that the length of the chamfered surfaces 81, 87 in the tire circumferential direction is greater than the length of the chamfered surfaces 83, 85 in the tire circumferential direction.

Note that in Example 3, "Longitudinal/lateral length percentage of chamfered surface" was adjusted such that "Longitudinal length percentage of chamfered surface" is "25"% for the chamfered surfaces 81, 87 and 15% for the chamfered surfaces 83, 85.

Also in Examples 4 to 7, "Longitudinal/lateral length percentage of chamfered surface" was adjusted such that "Longitudinal length percentage of chamfered surface" is "5"% for the chamfered surfaces 81, 87 and 3.3% for the chamfered surfaces 83, 85.

For Examples 3 to 7 in which "81, 87>83, 85", "Longitudinal/lateral length percentage of chamfered surface" and "Longitudinal length percentage of chamfered surface" in the table indicate values for the chamfered surfaces 81, 87 as representing values for the chamfered surfaces.

"Longitudinal/lateral length ratio of chamfered surface" refers to the ratio of the length of the chamfered surface in the tire circumferential direction to the length thereof in the tire width direction. The length in the tire circumferential direction and the length in the tire width direction were interchanged between the chamfered surface of Comparative Example 3 and the chamfered surface of Example 4.

"Longitudinal length percentage of chamfered surface" refers to the percentage of the length in the tire circumferential direction of each of the chamfered surfaces to the interval of the sipes that open to the chamfered surfaces, the sipes being adjacent in the tire circumferential direction.

"Circumferential direction overlap of chamfered surfaces" refers to the overlap of the ranges in the tire circumferential direction of the positions of the chamfered surfaces 81, 83, 85, 87. The "Yes" examples and comparative example have the same configuration as Example 5 except that the center region 73 was shifted in the tire circumferential direction with respect to the first middle region 71, so that the range in the tire circumferential direction of the position of the chamfered surface 83 overlaps the ranges in the tire circumferential direction of the positions of the chamfered surfaces 81, 85.

"Form of wall surface" refers to the form of the wall surface adjacent to the chamfered surface. "Inclined, steep" means that the wall surface is inclined with respect to the tire radial direction such that the deeper a location is in the depth direction on the wall surface, the closer the wall surface is to the chamfered surface, and that the wall surface extends away from the chamfered surface (such that the inclination angle with respect to the tire width direction increases) with respect to the extension direction of the sipe. "Vertical, gradual" means that the wall surface extends along the extension direction of the sipe without being inclined with respect to the tire radial direction.

"Number of ripe intervals of regions 71, 75" refers to the magnitude relationship between the number of intervals G1 of the first middle sipes 51 in the first middle region 71 and the number of intervals G2 of the second middle sipes 55, 57 in the second middle region 75. "71=75" means that the number of intervals G1 and the number of intervals G2 are the same, whereas "71<75" means that the number of intervals G2 is larger than the number of intervals G1. The "71=75" examples and comparative examples have the same configuration as the "71<75" examples except that the length of the interval of the second middle sipes 55, 57 was set to twice the length of the interval thereof in the "71<75" examples, and that the number of second middle sipes and that of the first middle sipes 51 are the same.

Comparative Example 1 has the same configuration as Comparative Example 2 except that the sipes 51, 53, 55, 57 were replaced with lug grooves.

These test tires were evaluated for noise performance and wet performance as described below. The results of the evaluation were indicated in Tables 1 and 2. In the evaluation, each of the test tires was mounted on a wheel having a rim size of 17×7.5J, mounted on a front wheel drive vehicle of engine displacement of 2400 cc, and inflated to an air pressure of 230 kPa.

Noise Performance

Each test tire was measured for pass-by noise outside of a vehicle in accordance with the European noise regulation conditions (ECE R117). The evaluation results were expressed as index values by using reciprocals of measurement values, with Comparative Example 1 being assigned as the reference 100. Larger index values mean excellent noise performance.

Wet Performance

Running at a speed of from 40 to 100 km/hr was performed on a test course of an asphalt road surface sprayed with water having a depth of less than 1 mm, and a test driver performed sensory evaluation on steering characteristics when changing lanes and when cornering, and on stability when traveling straight. Wet performance is expressed as index values with Comparative Example 1 used as a tire according to the related art and assigned as the reference 100. Larger index values indicate excellent wet performance.

The allowable range of the index value of noise performance for each of the tires having the size of 235/65R17 was evaluated to be 103 or more, and that of the index value of wet performance for the same was evaluated to be 96 and more, and a case meeting these conditions was evaluated to have succeeded in suppressing a decrease in wet performance while improving noise performance.

TABLE 1-1

|  | Comparative Example 1 | Comparative Example 2 | Comparative Example 3 | Example 1 | Example 2 |
|---|---|---|---|---|---|
| Lug groove or sipe | Lug groove | Sipe | Sipe | Sipe | Sipe |
| Presence of chamfered surface | No | No | Yes | Yes | Yes |
| Number of chamfered surfaces | — | — | 2 | 2 | 4 |
| Longitudinal lengths of chamfered surfaces 81, 87 and 83, 85 | — | — | — | — | 81, 87 = 83, 85 |
| Longitudinal/lateral length ratio of chamfered surface | — | — | 1:3 | 12:1 | 12:1 |
| Longitudinal length percentage of chamfered surface (%) | — | — | 1.7 | 20 | 20 |
| Circumferential overlap of chamfered surfaces | — | — | Yes | Yes | Yes |
| Form of Wall Surface | — | — | Inclined, steep | Inclined, steep | Inclined, steep |
| Number of sipe intervals of regions 71, 75 | — | 71 = 75 | 71 = 75 | 71 = 75 | 71 = 75 |
| Noise performance | 100 | 110 | 108 | 109 | 107 |
| Wet performance | 100 | 94 | 95 | 97 | 99 |

TABLE 1-2

|  | Example 3 | Example 4 | Example 5 | Example 6 | Example 7 |
|---|---|---|---|---|---|
| Lug groove or sipe | Sipe | Sipe | Sipe | Sipe | Sipe |
| Presence of chamfered surface | Yes | Yes | Yes | Yes | Yes |
| Number of chamfered surfaces | 4 | 4 | 4 | 4 | 4 |
| Longitudinal lengths of chamfered surfaces 81, 87 and 83, 85 | 81, 87 > 83, 85 | 81, 87 > 83, 85 | 81, 87 > 83, 85 | 81, 87 > 83, 85 | 81, 87 > 83, 85 |
| Longitudinal/lateral length ratio of chamfered surface | 15:1 | 3:1 | 3:1 | 3:1 | 3:1 |
| Longitudinal length percentage of chamfered surface (%) | 25 | 5 | 5 | 5 | 5 |
| Circumferential overlap of chamfered surfaces | Yes | Yes | No | No | No |
| Form of Wall Surface | Inclined, steep | Inclined, steep | Inclined, steep | Vertical, gradual | Vertical, gradual |
| Number of sipe intervals of regions 71, 75 | 71 = 75 | 71 = 75 | 71 = 75 | 71 = 75 | 71 < 75 |
| Noise performance | 108 | 110 | 111 | 112 | 111 |
| Wet performance | 99 | 98 | 98 | 99 | 101 |

A comparison between Comparative Example 1 and Example 1 reveals that the regions of the land portions including the sipes and the chamfered surfaces to which the sipes open being longer in the tire circumferential direction than in the tire width direction can suppress degradation of wet performance while improving noise performance.

A comparison between Comparison Example 3 and Example 1 reveals that the chamfered surfaces being longer in the tire circumferential direction than in the tire width direction improves wet performance.

A comparison between Example 1 and Example 2 reveals that an increase in the number of chamfered surfaces having mutually different positions in the tire width direction improves wet performance.

A comparison between Example 2 and Example 3 reveals that the lengths in the tire circumferential direction of the chamfered surfaces 81, 87 being greater than the lengths in the tire circumferential direction of the chamfered surfaces 83, 85 improves noise performance.

A comparison between Example 3 and Example 4 reveals that in a configuration in which the ratios of the lengths of the chamfered surfaces in the tire circumferential direction to the lengths thereof in the tire width direction are greater than 1, and 10 or less, noise performance improves.

A comparison between Example 4 and Example 5 reveals that in a configuration in which the ranges in the tire circumferential direction of the positions of the chamfered surfaces 81, 83, 85, 87 do not overlap each other, noise performance improves.

A comparison between Example 5 and Example 6 reveals that in a configuration in which the wall surface adjacent to the chamfered surface extends along the extension direction of the sipe opening to the chamfered surface without being inclined in the tire circumferential direction, wet performance improves.

A comparison between Example 6 and Example 7 reveals that a configuration including more intervals of the second middle sipes than those of the first middle sipes improves wet performance.

Although the tire according to an embodiment of the present technology has been described above in detail, the tire according to an embodiment of the present technology is not limited to the embodiments or examples that have been described above, and may of course be enhanced or modified in various ways without departing from the scope of the present technology.

The invention claimed is:

1. A tire having a tread pattern in a tread portion, the tread pattern comprising: a first circumferential main groove extending in a tire circumferential direction; a plurality of first sipes that extend in a tire width direction within a region of a first land portion in contact in the tire width direction with the first circumferential main groove and that are disposed at intervals in the tire circumferential direction; a first chamfered surface having a tread surface of the first land portion inclined toward the first circumferential main groove in an end portion in the tire width direction on a first circumferential main groove side of the first land portion, the first chamfered surface being provided in plurality in the tire circumferential direction, and the first sipes opening to the plurality of the first chamfered surfaces without reaching a groove wall of the first circumferential main groove; a second circumferential main groove extending in the tire circumferential direction and disposed at an interval in the tire width direction from the first circumferential main groove so as to sandwich the first land portion between the second circumferential main groove and the first circumferential main groove; a third circumferential main groove extending in the tire circumferential direction and disposed at an interval from the second circumferential main groove on an opposite side of the second circumferential main groove from the first circumferential main groove; a plurality of third sipes that extend in the tire width direction within a region of a second land portion between the third circumferential main groove and the second circumferential main groove and that are disposed at intervals in the tire circumferential direction; a third chamfered surface having a tread surface of the second land portion inclined toward the third circumferential main groove in an end portion in the tire width direction on a third circumferential main groove side of the second land portion, the third chamfered surface being provided in plurality in the tire circumferential direction, and the third sipes opening to the plurality of the third chamfered surfaces without reaching a groove wall of the third circumferential main groove; a fourth circumferential main groove extending in the tire circumferential direction and disposed at an interval from the third circumferential main groove on an opposite side of the third circumferential main groove from the second circumferential main groove; a plurality of fourth sipes that extend in the tire width direction within a region of a third land portion between the fourth circumferential main groove and the third circumferential main groove and that are disposed at intervals in the tire circumferential direction; and a fourth chamfered surface having a tread surface of the third land portion inclined toward the fourth circumferential main groove in an end portion in the tire width direction on a fourth circumferential main groove side of the third land portion, the fourth chamfered surface being provided in plurality in the tire circumferential direction and the fourth sipes opening to the plurality of the fourth chamfered surfaces without reaching a groove wall of the fourth circumferential main groove, and a length of the first chamfered surface in the tire circumferential direction being greater than a length of the first chamfered surface in the tire width direction, a length of the third chamfered surface in the tire circumferential direction being greater than a length of the third chamfered surface in the tire width direction, a length of the fourth chamfered surface in the tire circumferential direction being greater than a length of the fourth chamfered surface in the tire width direction, the length of the first chamfered surface in the tire circumferential direction being from 5 to 50% of a length of an interval of the first sipes adjacent in the tire circumferential direction, the first sipes opening to the first chamfered surface, and the length of the third chamfered surface in the tire circumferential direction being from 5 to 50% of a length of an interval of the third sipes adjacent in the tire circumferential direction, the third sipes opening to the third chamfered surface, the length of the fourth chamfered surface in the tire circumferential direction being from 5 to 50% of a length of an interval of the fourth sipes adjacent in the tire circumferential direction, the fourth sipes opening to the first chamfered surface, the first chamfered surface, the third chamfered surface and the fourth chamfered surface having a substantially triangular shape that decreases in length in the tire width direction from one side in the tire circumferential direction to an other side in the tire circumferential direction, and the tread pattern does not comprise lug grooves extending in the tire width direction within any of the regions of the first land portion, the second land portion and the third land portion.

2. The tire according to claim 1, wherein a ratio of the length of the first chamfered surface in the tire circumferential direction to the length of the first chamfered surface in the tire width direction is greater than 1, and 10 or less.

3. The tire according to claim 1, wherein a maximum depth of the first chamfered surface is greater than a depth of the first sipes opening to the first chamfered surface.

4. The tire according to claim 1, wherein the first sipes comprise a raised bottom portion at an opening end portion of the first sipes opening to the first chamfered surface, the raised bottom portion having a depth shallower than a maximum depth of the first sipes.

5. The tire according to claim 1, wherein the tread pattern further comprises, in the region of the first land portion, a wall surface of the first land portion adjacent to the first chamfered surface, the wall surface of the first land portion extending continuously from a wall surface of the first sipes, from an opening end portion of the first sipes opening to the first chamfered surface to a wall surface of the first circumferential main groove to which the first chamfered surface is inclined, and the wall surface extends without being inclined with respect to a tire radial direction.

6. The tire according to claim 1, wherein the tread pattern further comprises, in the region of the first land portion, a wall surface of the first land portion adjacent to the first chamfered surface, the wall surface of the first land portion extending continuously from a wall surface of the first sipes, from an opening end portion of the first sipes opening to the first chamfered surface to a wall surface of the first circumferential main groove to which the first chamfered surface is inclined, and the wall surface extends along an extension direction of the first sipes opening to the first chamfered surface.

7. The tire according to claim 1, wherein
the tread pattern comprises: a plurality of second sipes that extend in the tire width direction within a region of the first land portion and that are disposed at intervals in the tire circumferential direction; and a second chamfered surface having a tread surface of the first land portion inclined toward the second circumferential main groove in an end portion in the tire width direction on a second circumferential main groove side of the first land portion, the second chamfered surface being provided in plurality in the tire circumferential direction, and the second sipes opening to the plurality of the second chamfered surfaces without reaching a groove wall of the second circumferential main groove, and
a length of the second chamfered surface in the tire circumferential direction is greater than a length of the second chamfered surface in the tire width direction.

8. The tire according to claim 7, wherein the lengths in the tire circumferential direction of the first chamfered surface and the second chamfered surface are different from each other.

9. The tire according to claim 7, wherein
the region of the first land portion is disposed on one side of a tire centerline in the tire width direction, and
of the first chamfered surface and the second chamfered surface, the length in the tire circumferential direction of the one chamfered surface that is farther from the tire centerline is greater than the length in the tire circumferential direction of the one chamfered surface that is closer to the tire centerline.

10. The tire according to claim 7, wherein ranges of positions of the first chamfered surface and the second chamfered surface in the tire circumferential direction do not overlap each other.

11. The tire according to claim 7, wherein the first sipes and the second sipes are inclined to a same side in the tire circumferential direction with respect to the tire width direction.

12. The tire according to claim 7, wherein the first sipes and the second sipes are disposed alternately in the tire circumferential direction.

13. The tire according to claim 1, wherein the length of the third chamfered surface in the tire circumferential direction is smaller than the length of the first chamfered surface in the tire circumferential direction.

14. The tire according to claim 1, wherein a range in the tire circumferential direction of a position of the third chamfered surface does not overlap ranges in the tire circumferential direction of positions of the first chamfered surface and the second chamfered surface.

15. The tire according to claim 1, wherein the length of the fourth chamfered surface in the tire circumferential direction is greater than the length of the third chamfered surface in the tire circumferential direction.

16. The tire according to claim 1, wherein a range in the tire circumferential direction of a position of the fourth chamfered surface does not overlap ranges in the tire circumferential direction of positions of the first chamfered surface, the second chamfered surface, and the third chamfered surface.

17. The tire according to claim 1, wherein a total number of the first sipes and the second sipes is greater than a number of the fourth sipes.

18. The tire according to claim 1, wherein the tread pattern further comprises, in the region of the third land portion, a circumferential narrow groove extending in the tire circumferential direction, having a groove width smaller than a groove width of each of the first circumferential main groove, the second circumferential main groove, the third circumferential main groove, and the fourth circumferential main groove, and disposed at an interval from the third circumferential main groove and the fourth circumferential main groove, and the fourth sipe and the fourth chamfered surface are disposed in a region between the fourth circumferential main groove and the circumferential narrow groove in the region of the third land portion.

19. The tire according to claim 1, wherein the region of the first land portion and the region of the third land portion are disposed on opposite sides of a tire centerline in the tire width direction, and the tread pattern has a vehicle mounting orientation designated such that the region of the first land portion is disposed on a vehicle outer side.

20. The tire according to claim 1, wherein the first sipes close within the region of the first land portion, the third sipes close within the region of the second land portion, and the fourth sipes close within the region of the third land portion.

* * * * *